Figure 1:
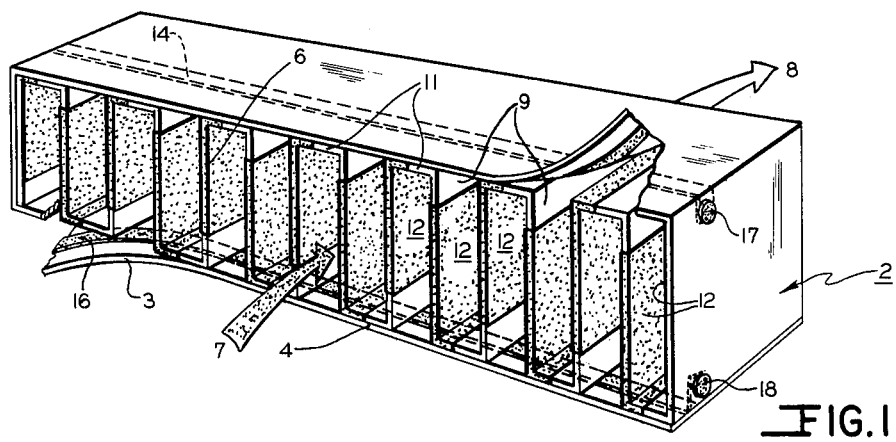

July 26, 1966  E. E. FOWLER  3,262,250
COLLECTOR CELL FOR ELECTROSTATIC PRECIPITATOR
Filed Aug. 29, 1963

INVENTOR.
EVANS E. FOWLER
BY
Ralph G. Brick
ATTORNEY

United States Patent Office 3,262,250
Patented July 26, 1966

3,262,250
COLLECTOR CELL FOR ELECTROSTATIC PRECIPITATOR
Evans E. Fowler, Louisville, Ky., assignor to American Air Filter Company, Inc., Louisville, Ky., a corporation of Delaware
Filed Aug. 29, 1963, Ser. No. 305,280
1 Claim. (Cl. 55—142)

The present invention relates to gas filters of the electrostatic precipitator type and more particularly to a disposable type collector cell for an electrostatic precipitator.

It long has been known in the art of gas cleaning to clean a gas stream by first passing it through an ionizing chamber whereby foreign particles therein are given electrostatic charges and then passing such stream through a collector chamber including a collector cell containing electrically charged plates to which the charged particles are attracted and to which they adhere. In order to avoid the many problems associated with the cleaning of such plates after precipitating operations, various attempts have been made to provide collector cells of a disposable type. For the most part, past disposable type collector cell arrangements have been complex and expensive in construction and have not been completely self-contained, quite often depending upon additional and elaborate permanent type installations in order to constitute an operative precipitating unit.

The present invention provides an inexpensive and straightforward disposable collector cell arrangement for an electrostatic precipitator which can be readily constructed with a minimum of parts and with a minimum of operational steps to provide a stable and efficient self-contained collector cell unit. In addition the collector cell arrangement of the present invention can be readily and efficiently assembled and disassembled as a unit cell in the electrostatic precipitator housing, requiring a minimum of additional parts for support and efficient precipitating operations.

Various other features of the present invention will become obvious to one skilled in the art upon reading the disclosure set forth herein.

More particularly, the present invention provides a collector cell for an electrostatic precipitator comprising: a continuous sheet of dielectric material folded to provide a plurality of spaced parallel side-by-side walls having intermediate wall connecting portions therebetween; each of the parallel walls being substantially coated on the face portions thereof with electrically conductive material with adjacent walls being electrically insulated from each other; passage means to permit flow of a gas stream to be treated through the cell parallel the coated walls; and, means to charge and ground side-by-side coated walls in alternate fashion to provide a potential gradient between adjacent walls.

It is to be understood that various changes can be made in the arrangement, form and construction of the apparatus disclosed herein without departing from the scope or spirit of the present invention.

Figure 2:
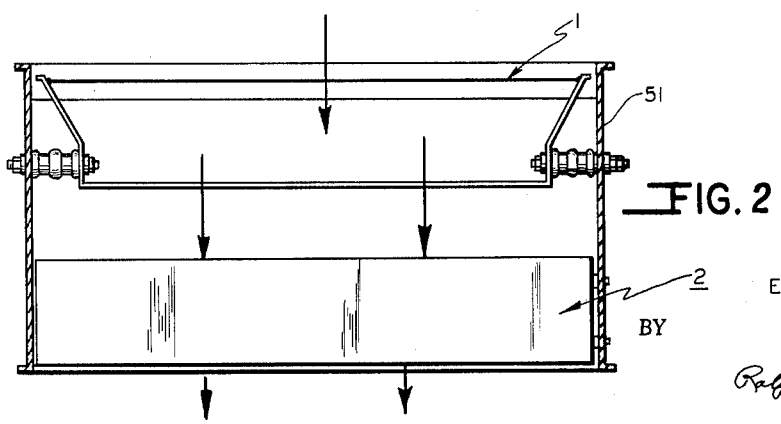

Referring to the drawing:

FIGURE 1 is a partially broken away perspective view of one advantageous embodiment of the present invention; and FIGURE 2 is a cross-sectional schematic plan view of an electrostatic precipitator incorporating a self-contained cell structure similar to that disclosed in FIGURE 1.

As can be seen in FIGURE 1, an inventive collector cell 2 is disclosed. Cell 2 can be constructed from a single, continuous strip 3 of sturdy, pliant, dielectric and disposable material such as chipboard or cardboard, or a suitable plastic material. More specifically, strip 3 can be scored to include integral end-to-end portions 4 and 6. Portion 4 of strip 3 can be scored into suitably sized panels and folded to form the four wall open-ended rectangular frame of unit collector cell 2 including a top, bottom and side walls, such frame further including dirty gas inlet passage 7 and clean gas outlet passage 8. Portion 6, which is integral with portion 4 of strip 3, also can be scored into suitably sized panels and folded in serpentine fashion to provide spaced, parallel side-by-side walls 9 extending between opposite side walls of the open-ended frame and intermediate wall connecting portions 11, the walls 9 and 11 being so positioned as to extend parallel to a gas stream to be treated as it passes through cell 2 from dirty gas inlet 7 to clean gas outlet 8. It is to be noted that in order to insure the overall stability of the cell structure, wall portions 11 formed from strip portion 6 can be fastened by some suitable means such as gluing or staples to the outer walls of the open-ended frame formed from strip portion 4. Thus, with the use of a comparatively inexpensive, continuous strip of sturdy, pliant, dielectric and disposable material, it is possible to erect an open-ended frame and internal side-by-side walls in an efficient, economical and uninterrupted folding operation. It is to be noted that the scoring and folding arrangement above described for erecting the frame and side-by-side walls from the continuous strip can be varied in some degree if desired. For example, instead of scoring a continuous strip 3 to permit folding of the outer frame first, as described above, it is possible to score the strip to permit folding one or two outer walls first, then the side-by-side walls 9 and intermediate wall connecting portions 11 and finally the remaining outer walls of the frame.

In order that the abovedescribed frame might function as a collector cell for an electrostatic precipitator, the side-by-side walls 9 and the intermediate connecting portions 11 are substantially coated on the face portions thereof with electrically conductive material 12 which can be applied in such a manner that opposite coated faces of each inner wall 9 and a part of an adjacent intermediate connection portion 11 are electrically connected to each other in such a manner that adjacent side-by-side walls are insulated from each other by the uncoated portion of the dielectric material which forms the strip. Thus, interleaved sets of side-by-side walls and intermediate connecting wall portions are provided to constitute, in effect, the collector plate arrangement of a collector cell. It is to be further noted that electrical coating also is applied to the inner face of the outer walls of the cell frame formed by strip portion 4, this coating being applied in such a manner that each of the inner faces is insulated from the inner side wall 9 immediate adjacent thereto.

In order to charge and ground the interleaved side-by-side wall sets in alternate fashion and thus provide a potential gradient between adjacent walls electrically conductive stripes 14 and 16 are provided to longitudinally extend along strip portion 4, each conductive stripe being arranged to electrically connect one of the two sets of interleaved walls. One end of stripe 14 is electrically connected to a terminal 17 and one end of stripe 16 is electrically connected to a terminal 18. By connecting terminals 18, 17 to an electric power pack and ground, respectively, it is possible to place an electrical potential gradient between adjacent walls of the cell.

It is to be noted that the electrically conductive coating applied to the walls of the collector cell 2 can be comprised of thin sheets of electrically conductive material such as aluminum foil which can be fastened to the strip by a suitable glue or staples. Advantageously, the continuous dielectric strip 3 can be printed at the same time that it is scored with an electrically conductive paint in the manner of a printed circuit. Then, all that is required is to set-up the strip in self-contained cell form.

As can be seen in FIGURE 2, once a collector cell 2 has been properly set-up, it is a simple matter to insert the cell into a flow-through precipitator housing 51, which housing includes in the upstream portion thereof an ionizer section 1. Although not disclosed in detail, it will be obvious to those skilled in the art that the ionizer section 1 and collector cell section 2 can be connected to any one of a number of types of suitable electrical power packs, known in the art.

The invention claimed is:

A collector cell for an electrostatic precipitator comprising: a continuous sheet of dielectric material including a portion folded to form an enclosed open-ended frame having top, bottom and side walls and a remaining portion folded within said frame to provide a plurality of spaced, parallel side-by-side walls extending between said top and bottom walls and having intermediate wall connecting portions therebetween in contact with said top and bottom walls; said side-by-side walls and said intermediate connecting portions extending parallel to a gas stream to be treated as it passes through said open-ended frame; each of said parallel side-by-side walls and a preselected portion of said intermediate wall-connecting portions being substantially coated on the face portions thereof with electrically conductive material with adjacent walls being electrically insulated from each other and with alternate coated intermediate portions being electrically connected to alternate side-by-side walls to provide first and second interleaved sets of coated side-by-side walls; and a pair of electrically conductive stripe means, one extending along that portion of said sheet of dielectric material forming said top wall of said frame and the other extending along that portion of said sheet of dielectric material forming said bottom wall of said frame with each contacting said coated intermediate wall connecting portions adjacent thereto to connect one of said interleaved sets of side-by-side walls to ground and the other to an electrical charge.

References Cited by the Examiner

UNITED STATES PATENTS

| | | | |
|---|---|---|---|
| 1,992,974 | 3/1935 | Thompson | 55—155 X |
| 2,535,697 | 12/1950 | Roos | 55—154 X |
| 2,565,458 | 8/1951 | Weisz | 55—142 |
| 2,579,440 | 12/1951 | Palmer | 55—154 X |
| 2,650,672 | 9/1953 | Barr et al. | 55—154 X |
| 2,735,509 | 2/1956 | Fields | 55—154 X |
| 2,822,057 | 2/1958 | Richardson | 55—143 |
| 2,868,319 | 1/1959 | Rivers | 55—154 X |
| 2,908,348 | 10/1959 | Rivers et al. | 55—154 X |
| 3,127,258 | 3/1964 | Revell | 55—500 X |
| 3,143,403 | 8/1964 | Swensen | 55—156 |

ROBERT F. BURNETT, *Primary Examiner.*